Figure 1:
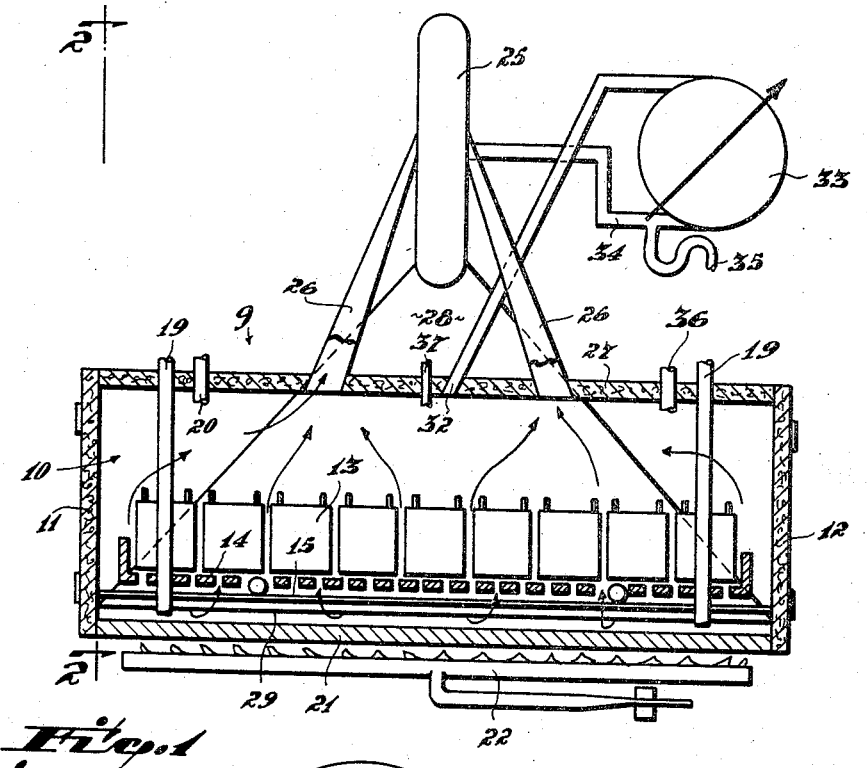

July 4, 1967

C. O. SCHILLING 3,328,893

BATTERY DRY-CHARGING METHOD AND APPARATUS

Filed Dec. 14, 1964

INVENTOR:
Carl O. Schilling
BY
Wood, Herron & Evans
ATTORNEYS

United States Patent Office 3,328,893
Patented July 4, 1967

3,328,893
BATTERY DRY-CHARGING METHOD AND APPARATUS
Carl O. Schilling, Joplin, Mo., assignor to The Eagle-Picher Company, Cincinnati, Ohio, a corporation of Ohio
Filed Dec. 14, 1964, Ser. No. 418,191
11 Claims. (Cl. 34—27)

This invention relates to the dry-charging of lead-acid batteries.

Dry-charged lead-acid batteries are adapted to be shipped and stored "dry," that is, without added electrolyte. They remain electrically inert until sulfuric acid of the proper gravity is added at the point of use. In this respect they differ from wet-charged batteries, to which the acid electrolyte is added in manufacture.

Because of its electrical inactivity prior to the addition of electrolyte, the dry-charged battery has a longer shelf-life than the wet-charged type, which slowly deteriorates during shipment and storage prior to use. Dry-charging is also useful as a means of avoiding the hazards of shipping a battery with sulfuric acid in its case.

In the manufacture of any lead-acid battery the positive and negative plates are "formed" in sulfuric acid to develop the necessary physico-chemical lead formations in the respective types of plates. If the battery is to be wet-charged, the plates are assembled in the battery case after forming, and electrolyte is then added by the manufacturer to activate the cells. In the production of a dry-charged battery, the plates after forming are washed free of acid and are dried to remove all moisture. The dry plates are assembled and sealed in a dry case. For most practical purposes, the dry-charged battery is ready for use immediately after the acid is added at the point of use.

The step of drying the plates of a dry-charged battery appears straightforward, but it is in fact quite critical. Improper drying of either the positive or the negative plates can very seriously impair the electrical properties developed by the battery after its activation. For highest quality to be achieved negative plates must be dried in the absence of oxygen and carbon dioxide; positive plates should not be dried at temperatures above about 250° F., and should not be subjected in the dry state to temperatures above 200° F. for a prolonged period else their activation rate will be reduced.

In the past, according to one technique, plates have been dried with an atmosphere of super-heated steam at about 250 to 370° F. While this method is probably the most effective previously known system for drying negative plates, nonetheless a lead-acid battery having negative plates dried by this method will display substantially lower capacity upon activation than it would have had if it had not been dry-charged.

The super-heated steam method is not satisfactory for drying positive plates of lead-acid batteries, because of the high temperatures which are necessarily used. If lower temperatures are used, condensation of the steam may re-wet the dried elements, resulting in very adverse effects on performance after activation. In commercial use of this method, the positive plates are usually dried separately, in air at lower temperatures. The method suffers from the further disadvantage that the equipment it requires is relatively expensive to install and operate.

According to another previously known plate drying method, combustion gas (a mixture of $CO_2$, $CO$, $O_2$ and inert gases) is impelled or forced through the assembled positive and negative plates at high velocity and temperature to dry them within a few minutes. This method requires careful control measures to avoid plate deterioration at the high drying temperatures used, which are typically about 340 to 360° F. It is impossible with this method to produce the highest quality dry-charged batteries because the drying atmosphere contains oxygen and carbon dioxide, which cause significant oxidation or carbonation of the spongy lead in the negative plates. The dry-storage characteristics of batteries dried by this method are generally acknowledged to be poorer than those of batteries containing negative plates dried by the super-heated steam method, and the method appears to be losing favor among battery manufacturers.

I have discovered a method and apparatus for dry-charging lead-acid batteries by which both negative and positive plates can be produced that are superior, in comparative tests, to those produced by either the super-heated steam method or the combustion gas drying method. Both this apparatus and method are inexpensive, as compared to previous methods, for production of high quality dry-charged batteries at low rates of production as well as at high rates.

According to this invention either the negative plates alone or the assembled positive and negative plates are dried in a heated atmosphere consisting essentially of light hydrocarbon gas. Among the suitable hydrocarbon gases are methane, ethane, propane, butane, acetylene, and mixtures of two or more of these. I prefer to use natural gas, although so-called "LPG" gas is also quite suitable. As will be shown hereinafter, use of a light hydrocarbon gas as the drying atmosphere surprisingly improves the performance of the plates upon their subsequent activation, in comparison to the performance of similar plates dried by super-heated steam or combustion gas.

The preferred apparatus of this invention, as adapted for batch drying operation, includes an air tight drying chamber with provision for loading the plates to be dried into it, a blower or cyclone having a gas intake and an outlet for recirculating the drying atmosphere through the drying chamber, means for removing water vapor from the recirculating drying atmosphere, a source of purging gas, a source of light hydrocarbon gas, preferably natural gas, and means for heating the drying atmosphere.

Under the conditions established within the drying chamber according to this method, the light hydrocarbon gas atmosphere demonstrates a surprisingly advantageous drying action. It apparently has a reducing tendency or effect on the negative plates, but without reducing the positive plates. Not only is oxidation of the negative plates avoided or removed, a surface condition is imparted to the negative plates which retards oxidation after drying and prior to activation, as will be shown.

Figure 2:
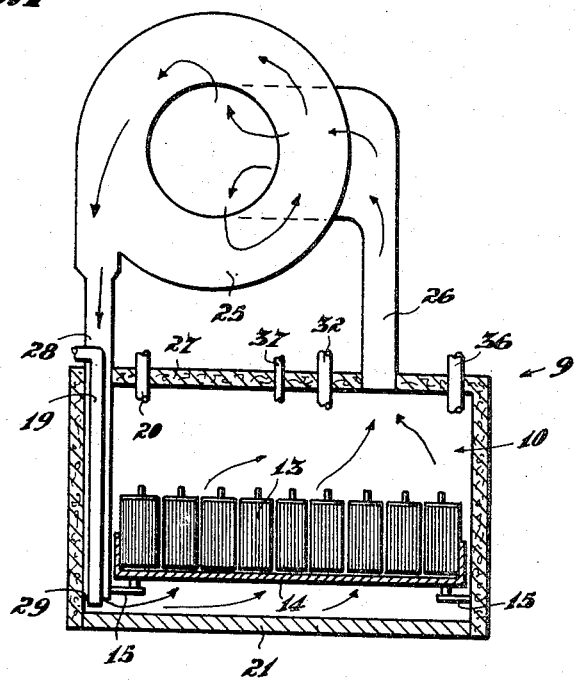

In the drawings,

FIGURE 1 is a vertical longitudinal section, diagrammatic as to some elements, of a preferred battery dry-charging apparatus in accordance with this invention, and FIGURE 2 is a transverse vertical section of the dry-charging apparatus taken on line 2—2 of FIGURE 1.

With reference to the drawing, the preferred dry-charging apparatus of this invention includes a substantially gas tight structure 9 defining within it a drying chamber 10. The structure 9 may comprise a rectangular, air-tight, insulated box as shown. The plates to be dried, designated at 13, are loaded into the drying chamber 10 through an end door 11 and are removed through an opposite end door 12 for straight-line flow of production. These doors 11 and 12 are hinged to permit a plate carrier or tray 14 to be rolled or otherwise moved into the interior 10 of the drying box. The plate carrier 14 has a latticed floor to permit free flow of the drying atmosphere through it and over all surfaces of the plates. It is convenient if the plate carrier 14 is wheeled to roll on tracks 15 extending longitudinally across the drying chamber 10 between the end doors 11 and 12.

A duct or conduit 19 extends to and opens adjacent the bottom surface 21 of the box 9, while another duct 20 opens adjacent the top of the box 9. Ducts 19 and 20 are provided with suitable valves, not shown, to close and open them to flow.

The purging and drying gases from sources not shown are admitted sequentially into drying chamber 10 through duct 19 or 20 and air is purged by displacement from the box through line 20 or 19, depending upon relative densities. I prefer to heat the drying atmosphere by means such as a gas burner 22 below the bottom 21 of the box. This burner 22 preferably heats substantially the entire area of the bottom 21, the heat being conducted through the bottom 21 to the drying gas as it flows over the bottom. The other walls of the box are insulated to reduce heat loss.

The heating means 22 should be capable of heating the drying gas to a temperature within the approximate range of 180–400° F. The temperatures employed will depend upon the type of plates being dried, and upon the manufacturer's objective. If negative plates only are being dried, temperatures up to about 300–370° F. or even somewhat higher may be used, whereas if positive plates or assembled positive and negative plates are to be dried, the temperature should be regulated so that the positive plates are not subjected to temperatures above about 200° F. for more than an hour after the plates are dry if highest quality is to be achieved. However, in the drying of positive plates temperatures up to about 275° F. may be used for brief intervals if highest quality is not required. Obviously, drying at lower temperatures will require longer drying times. Other atmosphere heating means than that shown can be used, for example, steam coils may be provided in the interior of chamber 10, preferably adjacent the bottom 21. Electric heat exchangers are another suitable alternative. It is also contemplated that the drying gas may be preheated before being introduced into the box.

A blower or cyclone 25 circulates the drying gas over the plates 13 in the drying chamber 10. This cyclone 25 has a pair of intake ducts 26, 26 opening through the top wall 27 of the box. The cyclone outlet or return conduit 28 preferably extends through the top wall 27 and flares downwardly to an outlet opening 29 which extends along substantially the entire length of the box adjacent the bottom wall 21 thereof. The drying atmosphere, which will pick up water vapor from the plates as they dry, is circulated in part through a line 32 to a condenser indicated diagramatically at 33, which is provided with suitable cooling means. Water condensed from the drying atmosphere is discharged through a drain trap 35. The condenser outlet line 34 is connected to an intake 26 of the cyclone 25.

Pressure within the drying chamber is measured and vented as necessary through a line 36 having a suitable gauge and valving not shown. Temperature within the drying chamber is measured by a thermometer 37.

A purging gas is preferably used to expel the initial air atmosphere from the drying chamber. This gas may be any non-explosive gas which is not reactive with the hydrocarbon drying gas or with the plates. Nitrogen or carbon dioxide is preferred, both being inexpensive and readily available. If a $CO_2$ purge is used it should be at room temperature or at least under 200° F.

As already stated, natural gas, which consists principally of methane, is preferred as the drying gas. Other suitable drying gases are the light hydrocarbon gases having 2–4 carbon atoms per molecule. Because the drying gas is combustible, it may according to one embodiment of the apparatus be taken off from the drying chamber 10 and ignited at burner 22 to supply heat to the drying chamber.

In the practice of the method of this invention, the formed plates 13 are washed free of residual forming acid, as conventional in any dry-charging system. The tray or carrier 14 with the negative plates or assembled positive and negative plates stacked in it is moved into the drying chamber 10 through door 11. The plates are arranged to allow the free circulation of the drying atmosphere over them. Drying of assembled plates will be quicker if the separators are removed, although it is not critical that they be removed. After the box is sealed but before heating begins, the purging gas is introduced into the chamber through line 19, displacing air through line 20, or vice versa, depending upon the comparative densities of the purging gas and air. (While the hydrocarbon drying gas itself may be used to purge air from the interior of the box, the drying gas-air mixture is explosive, for which reason use of an inert purge is preferred.)

The completion of purging with an inert gas may be determined by testing the gas escaping from line 20 to see whether it will support combustion. The flow of purging gas is then terminated, and the introduction of drying gas is initiated. Heat is simultaneously applied to the chamber by heating means 22.

The dry-charging method and apparatus of the invention permit the use of different time-temperature drying schedules as the manufacturer may desire to obtain different results, provided the specific schedule chosen is compatible with the chemical and physical properties and limitations of the active plate materials and separators. Some of the chemical and physical factors which must be taken into consideration are these:

(1) For the negative plates, the maximum temperature limiting factor is the temperature at which the grid metal or spongy lead oxide will melt, or the temperature at which organic additives usually present in the negative plates will deteriorate. As previously pointed out, maximum safe temperature for drying negative plates is approximately 400° F.

(2) If positive plates are subjected to temperatures above about 250° F. for prolonged periods, the rate at which they will activate is reduced. Positive plates can however be subjected briefly to temperatures as high as 275° F. although with some detriment to quality.

(3) If plates are dried with the separators in place, the nature of the separators may establish a limit on drying temperature. Some separators currently used may be dried at temperatures as high as 370° F. without being adversely affected, while others are harmed when subjected to temperatures above 250° F.

The battery manufacturer may choose a time-temperature schedule which will provide best results for his objectives and needs. For example, for the production of batteries of the highest quality, the battery should be disassembled prior to drying and the positive groups dried in air at room temperature. The negative groups are dried by a light hydrocarbon gas in accordance with the following preferred schedule:

*Negative groups only*

| Time, min.: | Temp., °F. |
|---|---|
| 15 | 150 |
| 30 | 212 |
| 45 | 250 |
| 60 | 300 |
| 75 | 350 |
| 90 | 370 |
| 105 | 350 |
| 120 | 300 |
| 150 | 200 |

Groups removed.

After drying the positive and negative plates are reassembled using any type of separators desired. Batteries dried in this manner will yield the highest capacities and discharge voltages when activated according to standard procedures.

For production of dry-charged batteries at maximum rates and lowest costs, I presently prefer that the assembled elements be subjected to drying temperatures on the order of 250 to 275° F. for the first half of the drying cycle and to temperatures of the order of 212 to 225° F. for the last half of the drying cycle. An example of a time-temperature schedule suitable for this objective follows:

*High rate drying of assembled plates*

| Time, min.: | Temp., °F. |
|---|---|
| 15 | 150 |
| 30 | 212 |
| 45 | 250 |
| 60 | 275 |
| 75 | 225 |
| 90 | 225 |
| 105 | 225 |
| 120 | 225 |
| 150 | 225 |
| 180 | 225 |
| 210 | 200 |

Elements removed.

The plates so dried will be of high quality with respect to retained capacity and dry storage characteristics, but may be somewhat slower to activate than batteries in which positive and negative groups were dried separately. That is, more than, say, twenty minutes might be required for the electrolyte to completely wet the positive plates, a condition necessary for yielding maximum discharge voltages. However, once the positive plates do become wet with electrolyte, the batteries produced by this method will be substantially equal to batteries containing positive and negative plates which were dried separately by the method first described.

It may be desirable to dry charge batteries as assembled elements when the construction is such that the rate of drying is restricted by especially thick plates, fiber glass separators, or other special design factors. Longer drying periods with temperatures at lower levels are preferred under these circumstances, for example in accordance with the following schedule.

*Special elements*

| Time, min.: | Temp., °F. |
|---|---|
| 15 | 150 |
| 30 | 212 |
| 45 | 250 |
| 60 | 275 |
| 75 | 250 |
| 90 | 250 |
| 105 | 225 |
| 120 | 225 |
| 150 | 225 |
| 180 | 200 |
| 240 | 200 |
| 300 | 200 |
| 360 | 180 |
| 420 | 180 |
| 480 | 180 |

In general, temperatures within the overall range of 180–275° F. can be used for drying positive plates and assembled positive and negative plates, and temperatures within the overall range of 180–400° F. can be used for drying negative plates, subject to the foregoing observations on the effect of higher temperatures within these ranges on quality of the plates.

The drying gas is recirculated through the battery plates, water vapor being removed from the gas in condenser 33. Drying requires about 2½ to 4½ hours in the examples given, and depends on drying temperature and the velocity of circulating of the drying atmosphere. By increasing the gas velocity drying times may be substantially reduced. Drying is preferably continued until no moisture is detectable in the plates as determined by use of a high resistance ohm meter. When the final traces of moisture have been removed from the plates, the supply of drying gas is closed and purging gas in reintroduced to expel the drying gas from the chamber. The drying gas purged from the box may be burned as it flows from release line 36. The dry-charging opeartion is then complete, and the elements are moved from the drying chamber.

In order to demonstrate the superiority of drying with a light hydrocarbon gas such as natural gas in relation to previous methods, comparative tests were performed wherein separate battery plates, all identically constructed and formed, were dry-charged using drying atmospheres of combustion gases, super-heated steam and natural gas. The percent of capacity as formed retained after dry charging and storing for various periods was then measured for the plates dried by each method.

In this test, several 15-plate, 100 ampere-hour batteries were constructed to be identical in all respects. The batteries were formed in series in 1.100 specific gravity sulfuric acid, with a forming current of 300 ampere-hours. Immediately after formation one element was removed and tested to determine its full capacity as formed, by adjusting the electrolyte specific gravity to 1.280 and discharging the element at 300 amperes at 80° F. Full or 100% capacity was found to be 7.8 minutes or 39 ampere-hours.

The remaining elements were washed acid free and were allowed to soak in wash water for approximately thirty minutes before dry charging. These elements were divided into three sets. One of the sets of elements was dried by the standard commercial combustion gas drying method, described for example in Patent No. 2,880,520. The other two sets of elements were each dismantled and their positive plates and negative plates separated. The positive plates of both sets were dried in air. The negative plates of one set were dried using the conventional superheated steam method at 220–370° F. for ninety minutes. The remaining set of negative plates was dried in the apparatus above described utilizing natural gas as the drying agent. The positive and negative plates of the disassembled sets were then reassembled and stored. One element from each of the three sets was activated immediately after drying and other elements from each set were activated each week successively to the completion of the test. All elements were discharged at 300 amperes to an end voltage of 1.0 volt twenty minutes after activation. Results from these tests are presented in Table I following:

TABLE I.—EFFECT OF TYPE OF DRYING ATMOSPHERE ON RETAINED CAPACITY OF DRY-CHARGED BATTERIES UPON ACTIVATION AFTER STORAGE

| Time | Percent of Full Capacity Retained, Type of Drying Atmosphere | | Natural Gas |
|---|---|---|---|
| | Comb. Gases | Super-Heated Steam | |
| Immediately after drying | 58 | 86 | 86 |
| After Standing—7 Days | 46 | 86 | 86 |
| After Standing—14 Days | 39 | 78 | 83 |
| After Standing—21 Days | 31 | 77 | 86 |
| After Standing—28 Days | 27 | 68 | 82 |
| After Standing—35 Days | 23 | 74 | 81 |

The percent of full capacity retained by a dry-charged battery element upon activation after storage is a conventional method of measuring the relative effectiveness of a dry-charging process. The data in Table I indicates that elements dried in an atmosphere of combustion gases lost 28% more of full capacity in drying than elements containing negative groups dried in an atmosphere of super-heated steam or of natural gas. Moreover, elements dried in combustion gas continually lost capacity at a relatively high rate while in dry storage. Elements containing negative groups dried in super-heated steam lost capacity at a slower rate than the combustion gas dried plates, yet elements containing negative groups dried in the apparatus and with the method of this invention lost capacity at less than half the rate even of the steam dried plates.

In another comparative test, a set of assembled positive and negative plates were dry charged by the method of this invention, and a separate but similar set of assembled plates were dried by the combustion gas method. Based upon determination of retained capacity as a percent of initial capacity, batteries containing positive and negative plates dried in the combustion gas atmosphere deteriorated after fourteen days in storage to only 39% of initial capacity, whereas the positive and negative plates dried by the present method retained 59% of initial capacity after the same period.

The superior results achieved by this process are believed to be due at least in part to the effect which the light hydrocarbon drying gas apparently displays in acting on the battery plates under conditions of drying. This atmosphere is not inert toward the plates; apparently spongy lead in the elements containing negative groups is oxidized to a lesser extent or is in fact reduced in comparison to steam-dried plates. It may be that this effect is due to the presence of carbon monoxide formed by reaction of methane and water:

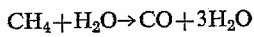
$$CH_4 + H_2O \rightarrow CO + 3H_2O$$

It is further theorized that the surface of the negative spongy lead absorbs a very thin, possibly monomolecular, layer of the light hydrocarbon drying gas which has a beneficial effect thereafter in storage by preventing or retarding absorption of moisture and oxygen from the air, thereby improving dry storage characteristics of the plates.

While I have described and illustrated this invention in relation to a batch drying operation, those skilled in the art will appreciate that the same method can be utilized in a continuous drying operation wherein, for example, the elements are moved continuously through a drying chamber through an inert gas screen at each end, appropriate adjustment in drying times and temperatures being made for optimum performance to be obtained.

Having described my invention, what I claim is:

1. In the production of dry-charged batteries of the lead-acid type, an improved method of drying wet, formed plates for such batteries, said drying method comprising, subjecting said plates to an atmosphere consisting essentially of at least one light hydrocarbon gas having from 1 to 4 carbon atoms per molecule, heating said atmosphere to a temperature which is in the range of about 180–275° F. for drying positive and negative plates simultaneously and which is in the range of about 180–400° F. for drying negative plates only, said atmosphere thereby removing water from said plates, removing water vapor from the atmosphere, and recirculating said atmosphere over the plates until the free moisture content of said plates is substantially nil.

2. The method of claim 1 wherein said light hydrocarbon gas is methane.

3. The method of claim 1 wherein said light hydrocarbon gas is LPG.

4. The method of claim 1 wherein said light hydrocarbon gas is natural gas.

5. In the production of dry-charged batteries of the lead-acid type, an improved method of drying the plates of said batteries comprising, circulating a drying gas consisting essentially of at least one light hydrocarbon gas having from 1 to 4 carbon atoms per molecule around said plates while simultaneously applying heat to said gas to maintain said gas at a temperature in the range of about 200–275° F. for drying assembled positive and negative plates and at a temperature in the range of 200–400° F. for drying negative plates only, continuously circulating at least a portion of said gas through means adapted to remove water vapor from said gas, and thereafter recirculating the said portion over said plates.

6. In the production of dry-charged batteries of the lead-acid type, an improved method of drying wet, formed plates for such batteries, said method comprising, placing said plates in a drying chamber, purging air from said drying chamber with an inert gas, introducing an atmosphere consisting essentially of at least one light hydrocarbon gas having from 1 to 4 carbon atoms per molecule into said chamber, heating said atmosphere and plates within said chamber to a temperature in the range of about 180–275° F. where said plates comprise both positive and negative plates and to a temperature in the range of about 180–400° F. where said plates comprise negative plates only, continuously withdrawing at least a portion of said atmosphere from said chamber and passing it to a condenser and removing water vapor therefrom, and recirculating said portion and the atmosphere in said chamber until the free moisture content of said plates is substantially nil.

7. The method of claim 6 wherein said atmosphere is recirculated by a blower having an intake communicating with said chamber above said plates and a return entering said chamber below the plates therein.

8. In the production of dry-charged batteries of the lead-acid type, an improved method of drying wet, formed plates for such batteries, said method comprising, placing said plates in a drying chamber, purging air from said drying chamber with an inert gas, introducing an atmosphere consisting essentially of at least one light hydrocarbon gas having from 1 to 4 carbon atoms per molecule into said chamber, applying heat to said chamber, atmosphere and plates therein by heating means external to and below said chamber to heat said atmosphere within said chamber to a temperature in the range of about 180–275° F. where said plates comprise both positive and negative plates and to a temperature in the range of about 180–400° F. where said plates comprise negative plates only, withdrawing at least a portion of said atmosphere from said chamber and removing water vapor therefrom, and recirculating said atmosphere and said portion in said chamber until the free moisture content of said plates is substantially nil.

9. In the production of dry-charged batteries of the lead-acid type, a method of drying wet, formed positive and negative plates for such batteries, said method comprising, placing said plates in a drying chamber, purging air from said drying chamber with an inert gas, introducing an atmosphere consisting essentially of at least one light hydrocarbon gas having from 1 to 4 carbon atoms per molecule into said chamber, applying heat to said atmosphere to heat said atmosphere and plates to a temperature in the range of about 250–275° F. for an initial period not exceeding about one hour and then reducing said temperature to a temperature within the range of about 212–225° F. until the free moisture content of said plates is substantially nil while withdrawing at least a portion of said atmosphere from said chamber and removing water vapor therefrom and recirculating said atmosphere and said portion in said chamber.

10. In the production of dry-charged batteries of the lead-acid type, an improved method of drying wet, formed plates for such batteries, said drying method comprising, drying said plates in natural gas heated to a temperature which is in the range of about 180–275° F. for drying positive and negative plates simultaneously and which is in the range of about 180–400° F. for drying negative plates only, said gas thereby removing water from said plates, removing water vapor from the gas, and recirculating said gas over the plates until the free moisture content of said plates is substantially nil.

11. In the production of dry-charged batteries of the lead-acid type, an improved method of drying wet, formed plates for such batteries, said drying method comprising, drying said plates in LPG gas heated to a temperature which is in the range of about 180–275° F. for drying positive and negative plates simultaneously and which is in the range of about 180–400° F. for drying negative plates only, said gas thereby removing water from said plates, removing water vapor from the gas, and recirculating said gas over the plates until the free moisture content of said plates is substantially nil.

References Cited
UNITED STATES PATENTS

| | | | |
|---|---|---|---|
| 1,310,871 | 7/1919 | Martin | 136—33 |
| 1,525,131 | 2/1925 | Hitchcock | 34—27 X |
| 1,806,853 | 5/1931 | Harlow et al. | 148—16.7 |
| 1,981,234 | 11/1934 | Hetzer | 34—77 |
| 2,480,146 | 8/1949 | Lee | 34—36 X |
| 2,627,838 | 2/1953 | Huggins | 34—225 X |
| 2,911,457 | 11/1959 | Sabatino et al. | 136—33 |
| 2,930,600 | 3/1960 | Boden | 263—28 |

FREDERICK L. MATTESON, JR., *Primary Examiner.*

D. A. TAMBURRO, *Assistant Examiner.*